United States Patent
McGuire et al.

(10) Patent No.: US 7,231,550 B1
(45) Date of Patent: Jun. 12, 2007

(54) EVENT PROTOCOL AND RESOURCE NAMING SCHEME

(75) Inventors: Cynthia A. McGuire, San Jose, CA (US); Michael W. Shapiro, San Francisco, CA (US); Andrew M. Rudoff, Boulder, CO (US); Emrys J. Williams, Milton Keynes (GB)

(73) Assignee: Sun Microsystems, Inc., Santa Clara, CA (US)

( * ) Notice: Subject to any disclaimer, the term of this patent is extended or adjusted under 35 U.S.C. 154(b) by 620 days.

(21) Appl. No.: 10/699,634

(22) Filed: Oct. 31, 2003

(51) Int. Cl.
*G06F 11/00* (2006.01)
(52) U.S. Cl. .......................................... 714/26; 714/39
(58) Field of Classification Search .................. 714/26, 714/37, 39
See application file for complete search history.

(56) References Cited

U.S. PATENT DOCUMENTS

| | | | | |
|---|---|---|---|---|
| 3,575,589 A | * | 4/1971 | Neema et al. ................. | 714/2 |
| 5,127,005 A | * | 6/1992 | Oda et al. ...................... | 714/26 |
| 5,515,503 A | * | 5/1996 | Shimomura et al. .......... | 714/26 |
| 5,845,272 A | * | 12/1998 | Morjaria et al. .............. | 706/50 |
| 6,421,740 B1 | * | 7/2002 | LeCroy ....................... | 719/331 |
| 6,708,291 B1 | * | 3/2004 | Kidder ......................... | 714/39 |
| 6,898,737 B2 | * | 5/2005 | Goeller et al. ................ | 714/39 |
| 7,013,239 B2 | * | 3/2006 | Hedlund et al. ............. | 702/182 |
| 7,013,411 B2 | * | 3/2006 | Kallela et al. ................ | 714/47 |
| 2003/0221005 A1 | * | 11/2003 | Betge-Brezetz et al. .... | 709/224 |
| 2004/0078695 A1 | * | 4/2004 | Bowers et al. ................ | 714/39 |

OTHER PUBLICATIONS

C. Lonvick; "RFC 3164—The BSD Syslog Protocol", Cisco Systems, Network Working Group, Aug. 2001; http://www.faqs.org/rfcs/rfc3164.html (22 pages).
UNIX man pages: kstat (1); excerpt from Man-cgi 1.15 by Panagiotis Christias, copyrighted 1994 (5 pages).

* cited by examiner

*Primary Examiner*—Gabriel Chu
(74) *Attorney, Agent, or Firm*—Osha Liang LLP (57) ABSTRACT

A method for managing a fault involves detecting an error, gathering data associated with the error to generate an error event, and categorizing the error event using a hierarchical organization of the error event.

65 Claims, 5 Drawing Sheets

EVENT PROTOCOL AND RESOURCE NAMING SCHEME

BACKGROUND

An error is an unexpected condition, result, signal, or datum in a computer system or network. A fault is a defect that may produce an error. When an error occurs that is attributable to a fault, logging the error and fault information is helpful to diagnose the fault, and effect recovery.

Conventional methods of logging system information include obtaining messages that provide information about the overall system, obtaining subsystem-specific kernel statistics, and polling subsystems to extract other subsystem-specific data. The aforementioned methods of logging system information may be coupled with a conventional notification scheme to allow data to be obtained when specific events occur. The system information obtained using the conventional methods is typically processed either using a system-specific diagnosis engine or read by a user, to determine the corresponding fault associated with the error.

In general, the conventional methods that provide information about the overall system, typically centrally log events that occur anywhere in the system. The conventional methods log events such as password changes, failed login attempts, connections from the internet, system reboots, etc. Information about the events is typically recorded in text format in a log file or series of log files, depending on how a utility performing the conventional message logging is configured. The individual events that are recorded are referred to as messages. In some cases, the utility performing the conventional message logging is configured to incorporate various types of information into the messages. For example, the messages may include information regarding the severity level of the event.

Further, the utility performing the conventional message logging may also be configured to indicate the general class of a program, commonly referred to as the "facility," that is generating the message. The standard facility names include: "kern" indicating that the message originated from the operating system, "user" indicating that the message originated from a user process, "mail" indicating that the message originated from the mail system, "auth" indicating that the message originated from a user authentication process or system, "daemon" indicating that the message originated from a system daemon (e.g., ftpd, telnetd), "syslog" denoting internal syslog messages, etc.

The following is a code sample showing an example of a message obtained using conventional message logging.

| Code Sample 1 | | | | |
|---|---|---|---|---|
| Jun 19 19:13:45 | ice | in.telnetd | [13550]: | connect from alpha.eng.brandon.edu |
| (1) | (2) | (3) | (4) | (5) |

Segment (1) corresponds to the date and time of the logged information, segment (2) corresponds to the system the message originated from (i.e., ice), segment (3) corresponds to the process the message originated from (i.e., in.telnetd), segment (4) corresponds to the identification number of the originating process, and segment (5) corresponds to the body of the message.

Utilities performing the conventional message logging may also include functionality to perform a certain action when a particular event occurs. The actions may include, for example, logging the message to a file, logging the message to a user's screen, logging the message to another system, and logging the message to a number of screens.

As noted above, information about system events may also be obtained using subsystem-specific kernel statistics. The utilities that obtain subsystem-specific kernel statistics typically examine the available kernel statistics on the system and reports those statistics which are requested by the user. The user typically specifies which statistics she would like to see using a command line interface. An example of output obtained using a typical utility for obtaining subsystem-specific kernel statistics is shown below.

| Output Sample | |
|---|---|
| cpu_stat:0:cpu_stat0:intr | 29682330 |
| cpu_stat:1:cpu_stat1:intrblk | 51 |
| (1)  (2)  (3)   (4) | (5) |

Segment (1) corresponds to the module where the statistic was generated. Segment (2) corresponds to the instance of the module in the system, in this particular example there are 2 instances (0 to 1) of the cpu_stat module. Segment (3) corresponds to the name of the module instance (e.g., cpu_stat0) from which the statistic is obtained. Segment (4) corresponds to the particular kernel statistic within the module (e.g., intrblk). Segment (5) corresponds to the fractional second since the particular process tracked by the system has been operating, in fractional seconds, since the system booted. While the above example provided fractional time of a given process within a module has been operating, the utilities providing subsystem-specific kernel statistics typically include functionality to provide additional kernel statistics including user access, system calls, wait times, etc.

The aforementioned means of obtaining system information, may be used with notification schemes to obtain system data when a particular event occurs. The notification schemes typically use traps to trigger the recording of an event.

SUMMARY

In general, in one aspect, an embodiment of the invention relates to a method for managing a fault. The method comprises detecting an error, gathering data associated with the error to generate an error event, and categorizing the error event using a hierarchical organization of the error event.

In general, in one aspect, an embodiment of the invention relates to a system for managing a fault. The systems comprises an error handler detecting an error and generating an error event using the error, wherein the error is defined using a hierarchical organization of the error event, a fault manager diagnosing the error event to obtain the fault and generating a fault event using the fault, wherein the fault event is defined using a hierarchical organization of the fault event, and a fault management architecture agent receiving the fault event and initiating an action in accordance with the fault event.

In general, in one aspect, an embodiment of the invention relates to a network system having a plurality of nodes. The network system comprises an error handler detecting an error and generating an error event using the error, wherein the error is defined using a hierarchical organization of the error event, a fault manager diagnosing the error event to obtain the fault and generating a fault event using the fault, wherein the fault event is defined using a hierarchical organization of the fault event, and a fault management architecture agent receiving the fault event and initiating an action in accordance with the fault event, wherein the error handler executes on any node of the plurality of nodes, wherein the fault manager executes on any node of the plurality of nodes, and wherein the fault management architecture agent executes on any node of the plurality of nodes.

Other aspects of embodiments of the invention will be apparent from the following description and the appended claims.

DETAILED DESCRIPTION

In the following detailed description of embodiment of the invention, numerous specific details are set forth in order to provide a more thorough understanding of the invention. However, it will be apparent to one of ordinary skill in the art that the invention may be practiced without these specific details. In other instances, well-known features have not been described in detail to avoid obscuring the invention.

Figure 1:
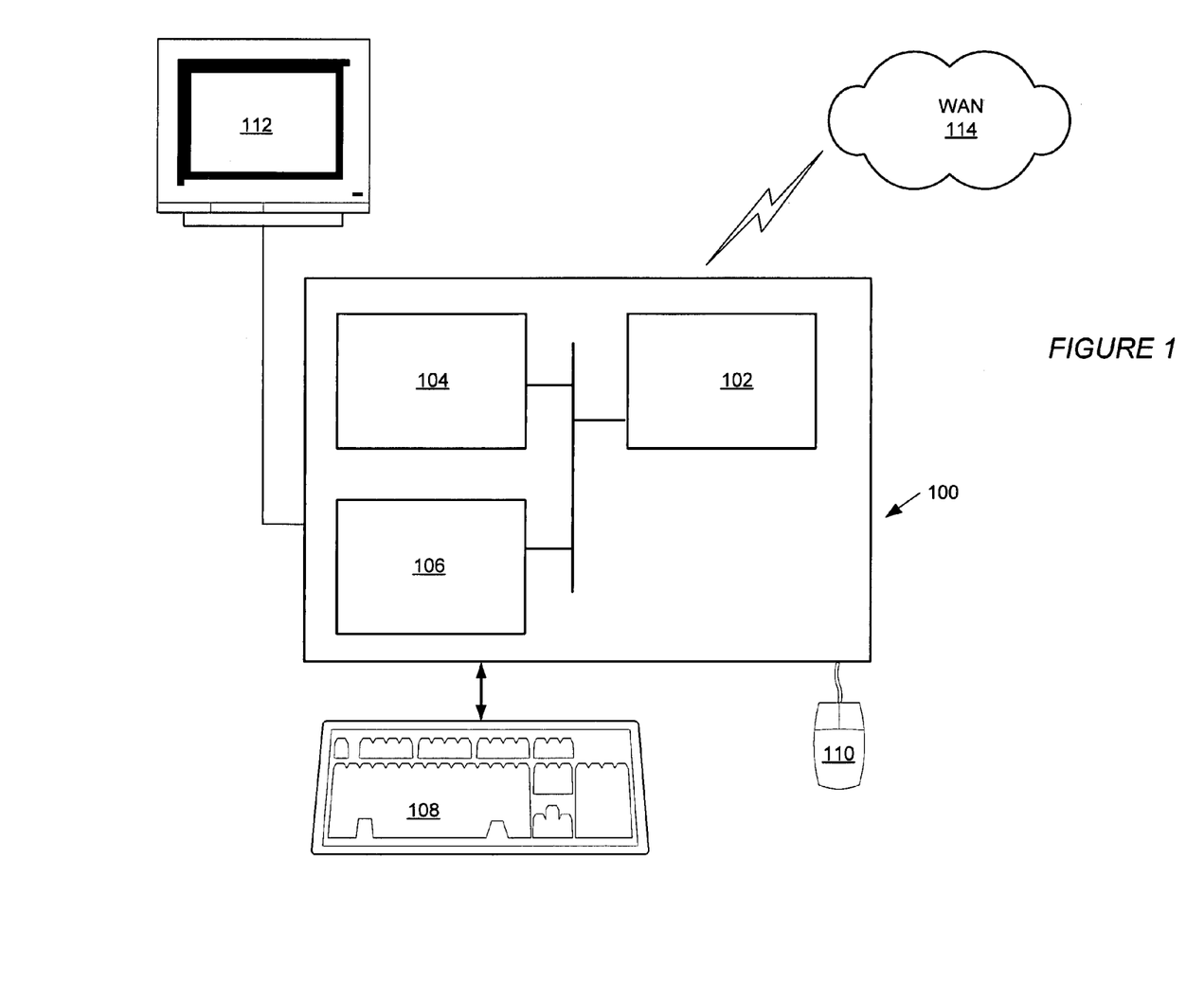
FIG. 1 shows a networked computer system in accordance with one embodiment of the invention.

The invention may be implemented on virtually any type of computer regardless of the platform being used. For example, as shown in FIG. 1, a networked computer system (100) includes a processor (102), associated memory (104), a storage device (106), and numerous other elements and functionalities typical of today's computers (not shown). The networked computer (100) may also include input means, such as a keyboard (108) and a mouse (110), and output means, such as a monitor (112). The networked computer system (100) is connected to a local area network (LAN) or a wide area network (114) (e.g., the Internet) via a network interface connection (not shown). Those skilled in the art will appreciate that these input and output means may take other forms. Further, those skilled in the art will appreciate that one or more elements of the aforementioned computer (100) may be located at a remote location and connected to the other elements over a network.

Figure 2:
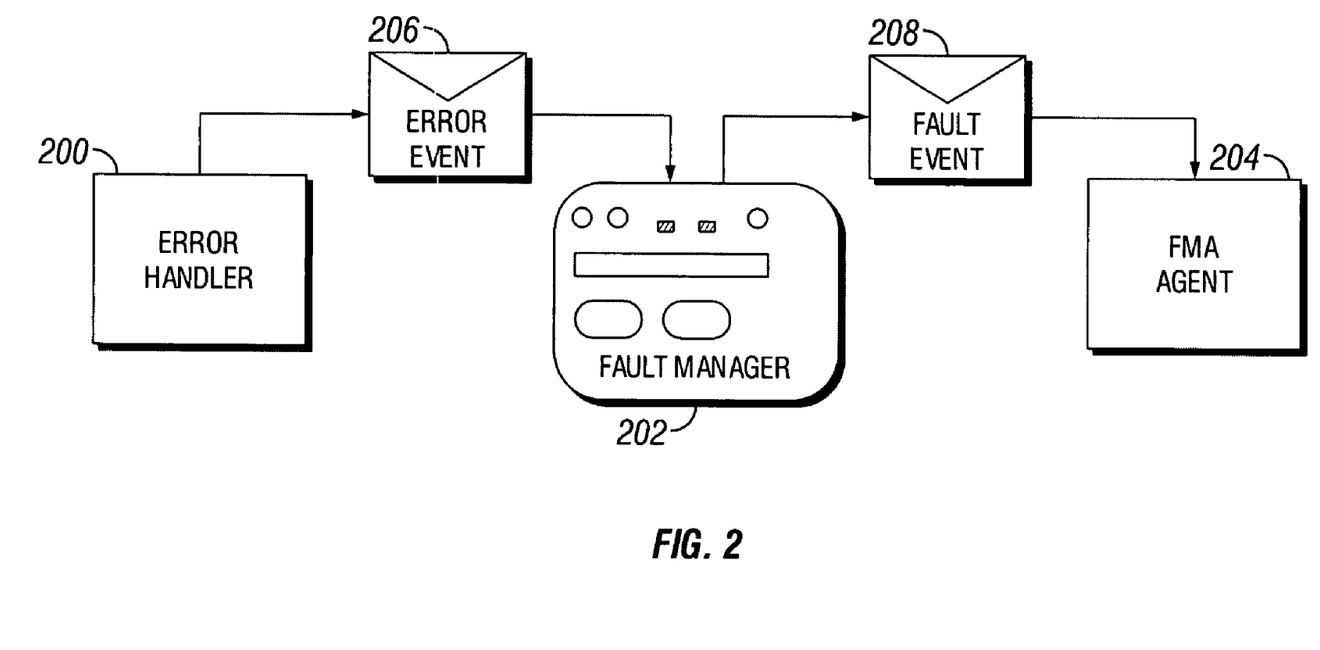
FIG. 2 shows a flow diagram for Fault Management Activities in accordance with one embodiment of the invention.

FIG. 2 shows a flow diagram for Fault Management Activities in accordance with one embodiment of the invention. In one embodiment of the invention, the three components are involved in fault management: an error handler (200), a fault manager (202), and a fault management architecture (FMA) agent (204). The error handler (200) is typically invoked when a trap is triggered (i.e., a certain set of conditions is met which indicate the occurrence of an error). The error handler (200) captures the error state and additional information as required by various embodiments of the invention, and generates an error event (206). Those skilled in the art will appreciate that the aforementioned components (i.e., the error handler (200), the fault manager (202), and the fault management architecture (FMA) agent (204)) may operate on one node in a network, or be distributed across a series of nodes in the network. Further, embodiments of the invention may be implemented using one or more instances of each component within a given system.

In one or more embodiments of the invention, the error event (206) denotes the asynchronous transmission of an error report to a piece of software (e.g., the fault manager (202)) responsible for subsequent diagnosis. The fault manager (202) records the incoming error event (206) and then forwards the error event (206) (or portions of an error event) to a diagnosis engine (not shown) for analysis. The diagnosis engine subsequently returns the results of the analysis to the fault manager (202). The fault manager (202) then uses the results of the analysis to generate a fault event (208). In one or more embodiments of the invention, the fault event (208) denotes the asynchronous transmission of a fault diagnosis to a piece of software (e.g., an FMA agent (208)) responsible for taking some action in response to the diagnosis, such as printing a message, failing over a service, paging an administrator, etc.

The error event (206) and the fault event (208) are defined using an FMA Event Protocol ("the protocol"). The protocol is a formal specification of the data transmitted with error events and fault events. The protocol defines a set of common data members that are used to describe the possible error events and fault events. The error events and fault events generated in accordance with embodiments of the invention may be used as input to diagnosis engines, message reports, or event logs, etc.

Figure 3:
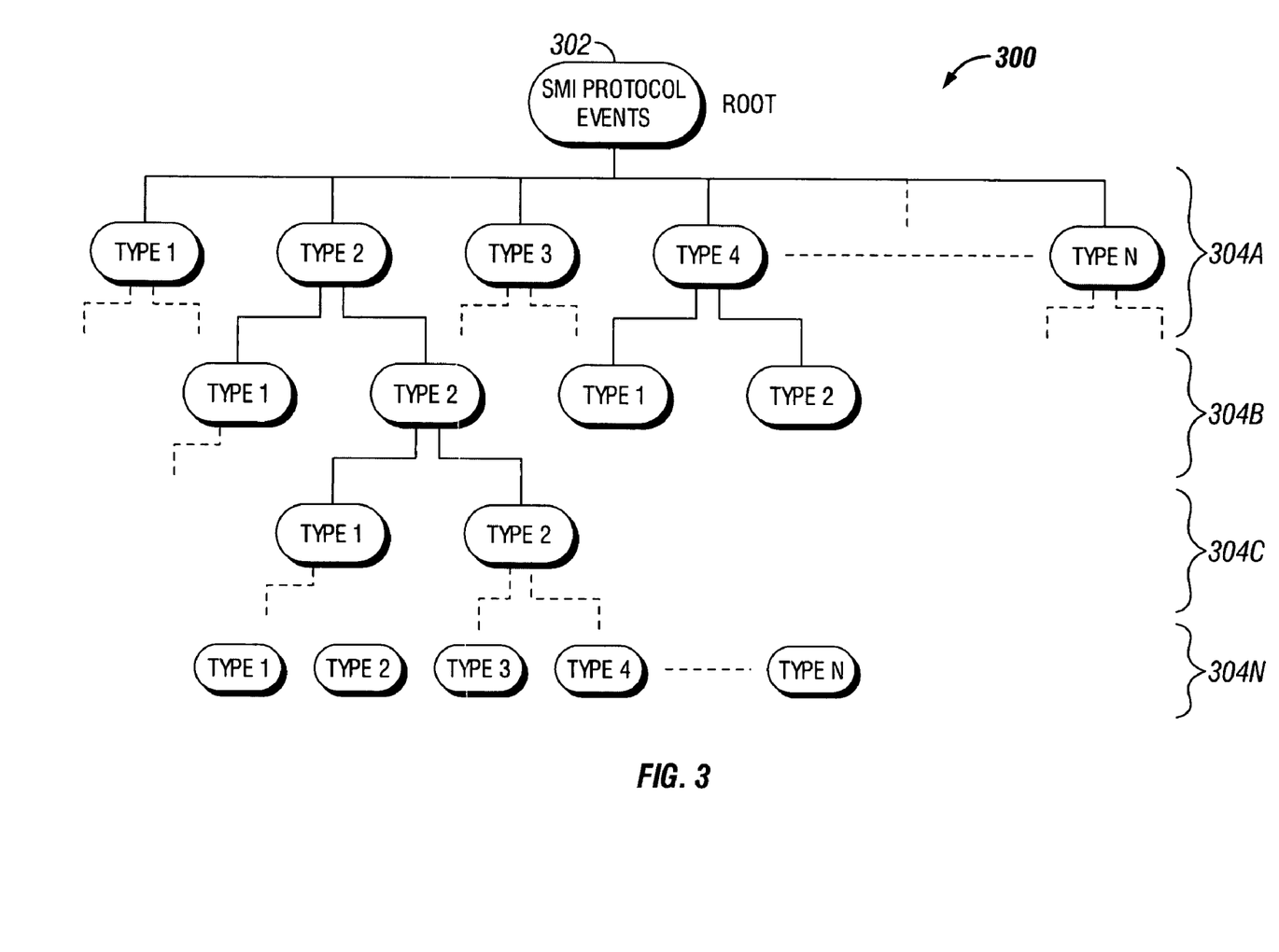
FIG. 3 shows an event class hierarchy in accordance with one embodiment of the invention.

The protocol organizes each event as part of a hierarchical tree (300), as shown in FIG. 3, with nodes serving as ranked categories. The hierarchical tree includes a root (302) corresponding to the set of all events defined by the protocol for a given system. Each level below the root (302) is a nested hierarchy of categories (e.g., 304A, 304B, 304C, and 304N) that terminates with a specific event type. Each category level (e.g., 304A, 304B, 304C, and 304N) in the hierarchical tree (300), is defined to have a set of data common to all event types within that level. This organization provides an efficient means to uniquely classify events for cataloging purposes while at the same time preserving the commonality between events of the same type and category level. Further, hierarchical tree (300) allows event receiving applications (e.g., fault managers (202), FMA agents (204), etc.) to programmatically filter or register for events according to event type and category level and thereby leveraging common code required to parse common event data.

In one embodiment of the invention, all the events in a given system, including error events and fault events, may be represented using one hierarchical tree, with category immediately below the root (302) (i.e., 304A in FIG. 3) including two branches, namely fault events, error events. In addition, a third category denoted as a suspect list may also be listed within this category of the hierarchical tree. The suspect list, in one or more embodiments of the invention, is defined as a list of fault events. Alternatively, each type of event may be represented in an individual hierarchy.

In one or more embodiments of the invention, each event in the protocol is specified using a payload. The payload of a given event within the protocol includes information defining the error, information describing a potential diagnosis, etc. The information maintained in the payload of a particular event may be recorded as a series of name-value pairs. In one embodiment of the invention, the protocol specifies that the name portion of the name-value pair begins with a letter (upper or lower case) and may be followed by one or more alphanumeric characters, hyphens ("-") or underscores ("_") The following is the Backus-Naur-Form ("BNF") notation for the aforementioned embodiment:

name=[a–zA–Z][a–zA–Z0–9_]*

With respect to the value portion of the name-value pair, the value portion of the name-value pair may be any data type including, but not limited to, an integer, a Boolean, a string, an enum, etc. Further, the value may also be an aggregation of the basic data types. Thus, the value may be an array of the basic data types, an array of name-value pairs, etc. The protocol does not constrain the size or composition of any of the aforementioned data types (basic or aggregate).

The following description provides details about various embodiments for specifying an error event in the protocol. As noted above, error events (also known as error reports) are generated upon the detection of an abnormal condition. The error events may be recorded in persistent storage in binary format and subsequently used as input to an automated diagnosis engine.

As noted above, each event is described by a payload of name-value pairs. With respect to error events, the payload includes information that may be used for diagnosis and logging of the error event. In one embodiment of the invention, the payload of the error event may include the following components: (1) version, (2) class, (3) error numeric association (ENA), (4) detector, (5) disposition, and (6) recoverable. Each of the components is described below. Note, each component may be represented as a name-value pair, as described above.

The version component, typically of integer type, is used to by processes that receive the error events, e.g., fault manager (202), to identify incompatible protocol changes to a particular event within the hierarchy. In one embodiment of the invention, the version component is initially set to 1 and is incremented when an incompatible change is made to the event specification. Incompatible changes include changes or deletions to existing member names or data types or changes to defined value enumerations.

The class component, typically of string type, defines the hierarchical path of the error event. In one embodiment of the invention, the event class is represented as a dot separated string:

<category1_type>[.<subcategory_type>]*.<category N_type>

The ENA component uniquely identifies an error event and also includes information about the error event's relationship to previous error events. In addition, the ENA component also includes necessary information to order error events in the system. Further, the ENA may be propagated between software subsystems and recorded in an error event for subsequent correlation by diagnosis software or used to determine the system configuration state during diagnosis as described with respect to FIG. 5.

To accommodate different identification capabilities of hardware and software, multiple ENA formats are provided by the protocol. Each format defines a unique identification of an event within a defined time boundary, data for ordering, and generational relationship information. In one embodiment of the invention, the individual ENA formats are identified using a two-bit format field. Individual ENA formats are described below.

Figure 4A:
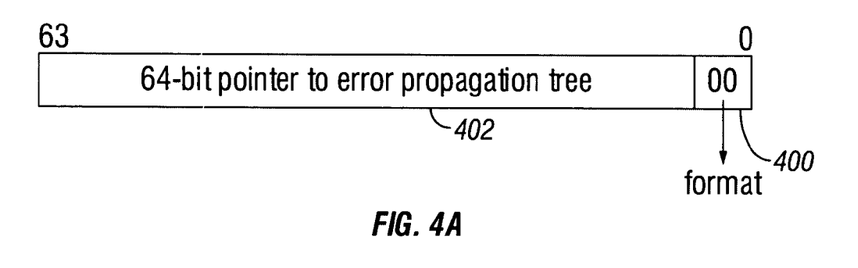
FIG. 4a shows ENA Format 0 in accordance with one embodiment of the invention.

FIG. 4a shows ENA Format 0 ("Format 0") in accordance with one embodiment of the invention. Format 0 includes a two-bit format field (400) and a 64-bit pointer to a bifurcated propagation tree that records a complex ENA sequence of an individual fault through a system (402). Format 0 is reserved for use by a FMA software implementation and is not transmitted using the FMA event transport. Format 0 permits the FMA implementation to create a more complex data structure to represent the complete propagation tree of an error through the software stack. When the particular FMA implementation transmits an error event across the event transport to a fault manager, the ENA in Format 0 is first converted to one of the other formats (e.g., Format 1, Format 2, etc.). In this manner, Format 0 permits the FMA implementation to offer additional application programming interfaces to allow the receiving process (e.g., Fault Manager (202)) to explore ENA relationships. (e.g., Format 0 allows the error handler to track the propagation of an error through the system and to provide this information to a receiving process for diagnosis).

Figure 4B:
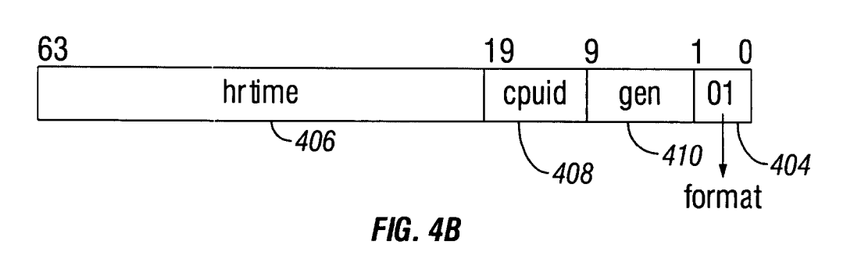
FIG. 4b shows ENA Format 1 in accordance with one embodiment of the invention.

FIG. 4b shows ENA ("Format 1") in accordance with one embodiment of the invention. Format 1 is a 64-bit unique identifier that includes certain fields used to indicate whether the associated error event is a new observation or whether it is an error that is the result of a previous error in a propagation chain, as defined above with respect to Format 0. Similar to Format 0, Format 1 includes a two-bit format field (404). In addition, Format 1 includes a 44-bit high resolution timestamp ("hrtime") field (406), a 10-bit processor id ("cpuid") field (408), and an 8-bit generation ("gen") field (410). The hrtime field (406) indicates the time the error event was generated. The cpuid field (408) is used to identify the processor on which the event generation thread is executing and may also be used to differentiate errors detected simultaneously on different processors. The gen field (410) is used to denote the number of ENA generations this error has caused.

A gen field (410) is particularly useful when an error event passes from one software entity to another for the purpose of error correlation during fault diagnosis. Error handlers may choose to generate a new error event or update the generation of an existing event (thereby indicating a secondary effect) within the current error handling flow. Format 1 is typically used by error handlers that capture error events from software modules or error handlers that capture individual error events from hardware and/or software.

Figure 4C:
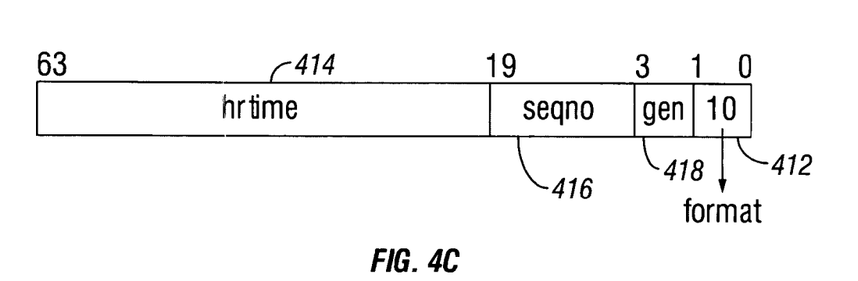
FIG. 4c shows ENA Format 2 in accordance with one embodiment of the invention.

FIG. 4c shows ENA Format 2 ("Format 2") in accordance with one embodiment of the invention. In general, Format 2 is used by processes that read out error events that have already been captured by another mechanism. More specifically, Format 2 is a 64-bit unique numeric identifier that includes certain fields that are used to indicate whether the associated error event is a new observation or whether the error is the result of a previous error in a propagation chain.

Similar to Format 0, Format 1 includes a two-bit format field (412). In addition, Format 2 includes a 44-bit high resolution timestamp ("hrtime") field (414), a 16-bit sequence number ("seqno") field (416), and a 2-bit generation ("gen") field (418). The hrtime field (414) indicates the time the error event was generated. The seqno field (416) is assigned by the software that is capturing the error event. Because Format 2 is intended for scenarios in which the error handler reads out a set of error events already captured by another mechanism (such as a set of hardware error registers that have latched values), the mechanism that initially captured the error events should assign values to the hrtime field (414) and the seqno field (416) in any appropriate manner that guarantees uniqueness of discrete error events and ordering. The mechanism which initially captured the error event may use ordering information available from the underlying error event capture mechanism to assign values to the hrtime field (414) and the seqno field (416).

The gen field (418) is used to denote the number of ENA generations this error event has caused. As noted above, the generation number is useful when an error event passes from one software entity to another for the purpose of error correlation during fault diagnosis. Error handlers may choose to generate a new error event or update the generation of an existing event (thereby indicating a secondary effect) within the current error handling flow. Because Format 2 is intended for use by error handlers that read sets of error events captured by other mechanisms, the generation value is capped at a small value as the secondary effects of the initial error event are usually propagating in a different fault domain. In one embodiment of the invention, the fault domain is a logical partition of hardware or software elements for which a specific set of faults is defined to be contained within the enclosing boundary.

Those skilled in the art will appreciate that while the various ENA formats have been described with respect to 64-bit fields and sub-portions thereof, the various components of the ENA, regardless of format, may be of any size and placed in any order within the ENA. Further, the ENA, regardless of format, may be of any size.

As noted above, the ENA formats include the necessary information to order the error events. The ordering capability is important, as systems may undergo dynamic reconfiguration changes between the time that an error is detected and reported, and the time when the error event is received for activities such as diagnosis, reporting, recovery and repair. Thus, to ensure that the analysis of the error event is performed in view of the system configuration at the time the error occurred, as opposed to the time the error event was reported, management applications and diagnosis engines may use the timestamp component of ENA to correlate the error event with a previous or current configuration of the system in which the event occurred.

A configuration snapshot provides information about the system configuration at a particular time. Thus, a timestamp corresponding to the time of reconfiguration, and the ENA timestamp can be used to determine the configuration interval in which the event was generated. The information may then be used with configuration snapshots of the system at various times to determine the configuration of the system at the time of the error.

Figure 5:
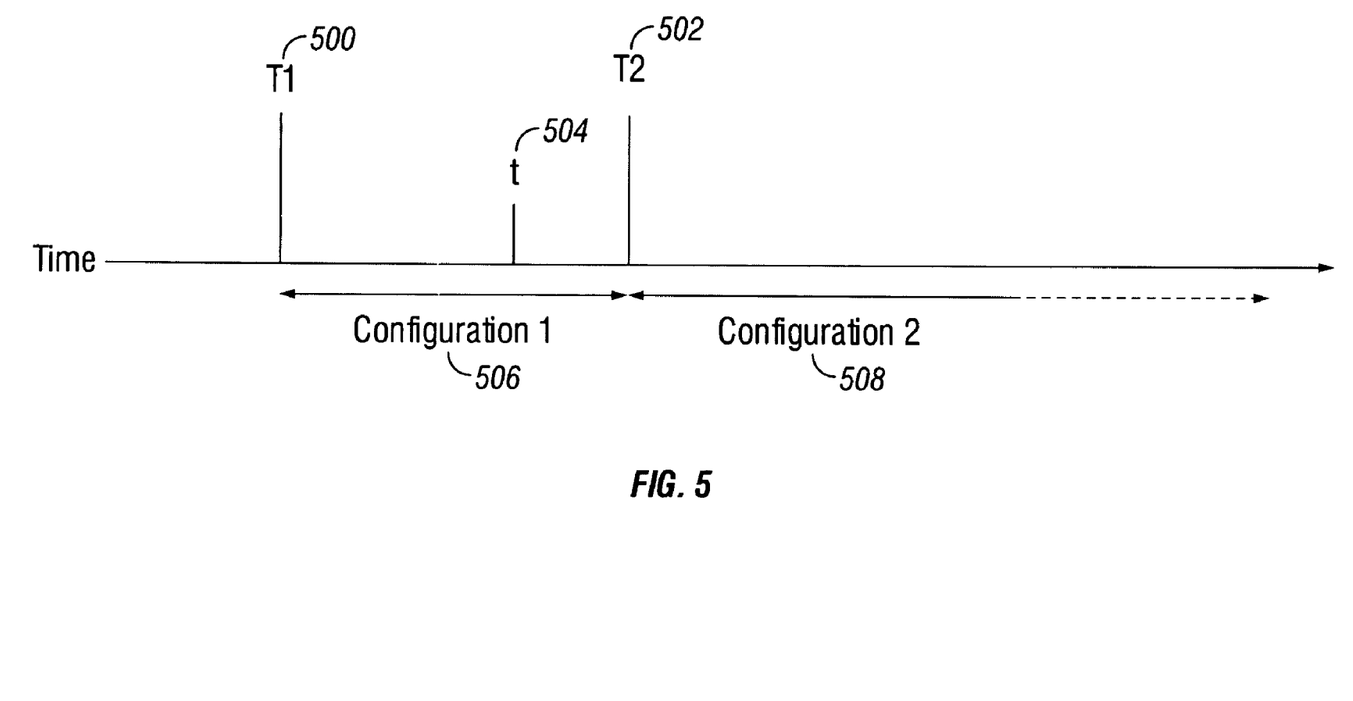
FIG. 5 shows a timeline in accordance with one embodiment of the invention.

FIG. 5 shows a timeline in accordance with one embodiment of the invention. The timeline shown in FIG. 5 shows that an error event was generated at time (t) (504), and that the system had a first configuration ("configuration 1") (506) during the time interval [T1 (500), T2 (502)], and a second configuration ("configuration 2") (508) during the time interval [T1 (500), ∞]. By comparing the timestamp of the configuration snapshots (i.e., times at T1(500) and T2(502)) with the timestamp in the ENA associated with the error event generated at time (t) (504), the diagnosis engine can determine that, in this example, the error event was generated while the system was in configuration 1. Those skilled in the art will appreciate that the system must record the timestamp of configuration snapshots in a form that is equal to the ENA timestamp format or in a form that may be compared with the ENA timestamps.

Those skilled in the art will appreciate that while the ENA component has been defined as having three formats (i.e., Format 0, Format 1, and Format 2), additional formats may also be incorporated into the protocol. For example, a fourth format (e.g., Format 3) may be used to indicate the presence of an extended format field thereby allowing the current ENA formats to be extended beyond 64-bits.

Returning to the discussion of the error event components, the detector component, typically of Fault Managed Resource Identifier (FMRI) type, identifies the resource that detected the error event. The FMRI data type is described below. The ENA and detector uniquely identify an error event for the system in which it was generated.

The disposition component, typically of enum type, indicates whether the error handling code attempted to correct a particular error, and if so, whether this attempt was successful. To indicate whether the error handler's attempt was successful, the disposition component defines four enumerated disposition states in accordance with an embodiment of the invention: uncorrected, self-corrected, uncorrectable, and soft-corrected. Each state is described below.

A disposition of "uncorrected" is used to indicate that the error handler made no attempt to correct the error. The lack of attempt to correct the error may also indicate that it is not possible for the error handler to correct the error. A disposition of "self-corrected" is used to indicate that the error handler made no attempt to correct the error but the error has been corrected, indicating that the error was automatically corrected (perhaps by hardware) without the handler needing to take action. A disposition of "uncorrectable" is used to indicate that the error handler attempted to correct the error but failed to do so. Finally, a disposition of "soft-corrected" is used to indicate that the error handler successfully corrected the error.

The recoverable component, typically of Boolean type, indicates whether or not the detector believes the error to be recoverable. If this field is set to false, the process receiving the error event, e.g., Fault Manager (202), can assume that the error handling response was to initiate a failure of the fault domain in which the error was detected.

Those skilled in the art will appreciate that while the error events have been described as having a payload with aforementioned components, the error events may include additional information to facilitate diagnosis or further describe the error event. Further, the error events may also be defined using a subset of the aforementioned components.

The following description provides details about various embodiments for specifying a fault event in the protocol. Fault events are generated whenever fault management software diagnoses a fault or a list of suspected faults. The data included in the fault event typically forms the basis of fault log messages. The information included in the error event is typically used together with information contained in policy and repository databases enabling a fault management system, e.g., Fault Manager (202), to generate a fault event. Fault events are typically received by reconfiguration agents (e.g., FMA agent (204)), and service and system management applications. Fault events are typically recorded in binary format to persistent storage according to the diagnosis time.

In one or more embodiments of the invention, the fault events are grouped together and transmitted as part of a suspect list. The suspect list, including the fault events, forms a stable interface upon which service tools and management providers and agents, such as Common Information Model (CIM), may rely for system fault information.

Further, data contained in the fault events may be mapped to other protocol schema for consistency in a heterogeneous environment.

As noted above, each event is described by a payload of name-value pairs. With respect to fault events, the payload includes information that may be used to dictate action by the aforementioned management providers and agents. In one or more embodiments of the invention, the payload may include the following components: (1) version, (2) class, (3) fault-diag-time event, (4) Diagnosis Engine ("DE") Identifier, (5) ENA list size, (6) ENA-list, (7) Automatic System Reconfiguration Unit ("ASRU"), (8) Field Replaceable Unit ("FRU"), (9) resource, and (10) certainty. Each of the components is described below. Note that each component may be represented by a name-value pair, as described above.

The version and class components in the fault event are defined in the same manner as the version and class components in the error event, as described above. The fault-diag-time component, typically an array of integers, is used to record the diagnosis time of the error event to generate the fault event. The DE component, typically of FMRI type, identifies the DE used to diagnosis the error that subsequently generated the associated fault event. The FMRI type is described below.

The ENA-list size component, typically an integer, indicates the number of entries in the ENA-list component. The ENA-list component, typically an array of ENA entries, describes the error event set that contributed to the diagnosis of this fault. The ENA-list may be used in post-mortem analysis of diagnosis accuracy, defects, effectiveness, etc.

The ASRU component, typically of FMRI type, represents the smallest unit that can be reconfigured or disabled following fault diagnosis. The ASRU component is included in the fault event to allow an FMA agent (204), for example, to use system configuration software to disable or reconfigure this resource immediately in advance of a repair. The FMRI type is described below.

The FRU component, typically of FMRI type, represents a unit which must be repaired in order to clear the fault from the system. The FRU is included in the fault event so that the unit name may be displayed in a message indicating what action should be taken to repair the fault, and in some cases triggers additional notification devices such as activation of light LEDs, etc. to notify the user to take action. The FMRI type is described below.

The resource component, typically of FMRI type, defines the finest-grained resource identified during the diagnosis. The FMRI type is described below. The certainty component, typically of integer type, indicated the accuracy level of the diagnosis as determined by the DE.

Those skilled in the art will appreciate that while the fault events have been describe as a having a payload with aforementioned components, the fault events may include additional information to facilitate reporting of the diagnosis or to further describe the fault event. Further, the fault events may also be defined using a subset of the aforementioned components.

As noted above, suspect lists include one or more fault events. The suspect lists, generated in the protocol as list events, provide a means for fault management software to express a list of suspected faults following the conclusion of diagnosis. Similar to error events and fault events, the list event is defined using a hierarchical tree structure.

In one embodiment of the invention, each list event is identified using a list event class (i.e., hierarchical path) and the following components: (1) version; (2) class; and (3) list size. The components in the list event may be represented as name-value pairs. The version and class components in the fault event are defined in the same manner as the version and class components in the error event, as described above. The list size, typically of type integer, indicates the number of elements in the list event (i.e., the number of potential suspected faults).

In addition, the list event may include one or more of the following additional components: (1) Universal Unique Identifier (UUID) component, typically of string type, used to identify the suspect list, (2) code corresponding to FMA event code written in human-readable form used in communication with enterprise services, (3) a diagnosis engine ("DE") identifier component, typically of FMRI type, used to identify the DE used to diagnosis the error that subsequently generated the associated fault event, (4) fault-diag-time component, typically an array, corresponding to the adjusted diagnosis time of day for this list event, and (5) a fault-events component, typically an array of fault events, defining an array of individual fault events.

The following description provides details about various embodiments for specifying the FMRI type in the protocol. The FMRI type, corresponds to the resource name, and is used to identify resources that detect an error, resources that are affected by an error, resources that have had a change of state following fault diagnosis, etc. Further, the FMRI type identifies fault managed components and services and provides a stable namespace for layered administrative or service software. As noted above, the FMRI type describes the detector component in error events and the ASRU component, the FRU component, and resource component in fault events. In addition, the FMRI data type may also be used in class-specific error event data to identify the resource that is affected by the detected error or the resource that must be replaced following diagnosis.

The FMRI type is an aggregate data type and may be represented as a list of name-value pairs or hierarchical text string ("text representation"). The FMRI type typically includes an FMRI authority component, as well as additional components that are used to identify the resource.

The FMRI authority component describes the system or subsystem responsible for managing the state of the resource. The FMRI authority component is unique to the environment in which the resource resides. For example, on a platform that is composed of a service processor and a number of hardware domains, the FMRI authority component must be capable of distinguishing resources for the platform enclosure, the service provider, and each of the domains. The FMRI authority component is used to indicate to software analyzing the error event, the fault event, or the suspect list, the source that should be queried in order to determine the latest resource status or additional resource type-specific information.

FMRI authority component is typically required for fault events and error events that are transmitted from one fault manager to another. The following table lists components that may be used to define the FMRI authority component that accompanies each instance of the FMRI type.

| Authority Elements | | |
| --- | --- | --- |
| Name | DataType | Description |
| Chassis-id | String | Chassis identifier |
| product-id | String | Product identifier |

-continued

Authority Elements

| Name | DataType | Description |
|---|---|---|
| domain-id | String | Domain name |
| server-id string | String | Server-based naming authority as defined in RFC-2396 |

As noted above, the FMRI type may be represented as a series of name-value pairs or a hierarchical text string. When the FMRI type is represented as a set of name-value pairs, each name-value pair represents a sub-component of the resource name in order of increasing granularity. For a hardware resource, the name-value pairs might describe the resource and indicate its physical location. For a software resource, the identifier might name a service instance. In one embodiment of the invention, the specific name-value pairs used to describe the FMRI sub-components are governed by a resource scheme. The resource schemes are described below.

While FMRI type may be represented as a series of name-value pairs, in some scenarios it is desirable to represent the FMRI type as a hierarchical text string. For example, a hierarchical text string is desirable when fault events are incorporated into fault messages or used as a key into a resource repository, such as the Solaris® Fault Manager. In one embodiment of the invention, the hierarchical text string representation of the FMRI type is generated from the name-value pair list. A software library may be used to convert FMRIs between name-value pairs representation and hierarchical text string representation.

In one embodiment of the invention, the syntax for describing an FMRI type as a hierarchical text string is based upon Uniform Resource Identifiers (URI): Generic Syntax (RFC-2396). RFC-2396 is incorporated by reference into the present specification. In general, a URI is a string of characters used to identify an abstract or physical resource. Typically, the resource is one that can be located on the Internet where a URI is a superclass of the familiar URL.

The hierarchical text string used to represent the FMRI type uses the syntactical model outlined in RFC-2396 to create a consistent namespace for fault management. The general syntax of the hierarchical text string is dependent upon the particular resource scheme (defined below) and is arranged in a hierarchy. The general syntax of the hierarchical text string for the FMRI type is as follows: <fmri-scheme>://[<authority>]<path>

The fmri-scheme field specifies the format of the hierarchical text string and owner of the repository in which status and property information is kept for resources described by path field. Optionally, the authority field provides a means by which resources may be identified relative to the system in which they exist. In one embodiment of the invention, the authority field is one or more comma separated name equals value strings, e.g., [<name>=<value>], [[<name>=<value>)]+]. For example, the authority field for a resource that is assigned to domain A of a SunFire 15000 may be written as: product-id=SunFire 15000, chassis-id=138A2036, domain-id=A.

Continuing with the description of the hierarchical text string, the path field identifies the resource as specified by the FMRI-scheme. In one or more embodiments of the invention, the path may include a sequence of path segments separated by a single slash "/" character. Further, within a path segment, the characters ":", ";", "=", "@", and "?" may be also reserved.

The following sections describe embodiments of the FMRI resource schemes. Each resource scheme is described in terms of the required name-value pair components and the syntax for constructing a corresponding hierarchical text string representation. The definition and syntax for each scheme is determined by the resource owner and presented in a way consistent with the owner's internal representation of the resource. Further, although four resource schemes are described below, additional schemes may be defined and these schemes are not intended to limit the scope of the invention.

A hardware component ("hc") scheme includes information required to identify a hardware component. This resource scheme is typically used to define the detector component in an error event, or an ASRU, FRU, or resource component in a fault event. The unique identification of an individual component is derived from the instance number of the hardware component and the hierarchical physical system location.

The hc scheme includes some or all of the following name-value pairs:

| Name | Type | Description |
|---|---|---|
| hc-name | String | Name of hardware component |
| hc-id | String | Hardware component instance |
| scheme | String | value = "hc" |
| serial | String | Serial number of component |
| part | String | Part number of component |
| revision | String | Revision number of component |
| authority | Authority (as defined above) | System Identifier |
| hc-root | String | Root of hardware component path |
| hc-list-sz | Integer | Size of hc-list array |
| hc-list | ordered array of hardware components | Hardware component list |

The corresponding hierarchical text string representation is constructed by concatenating the hardware component array elements. In one embodiment of the invention, the general syntax for the hc scheme is as follows: hc://[<authority>][/<hardware-id>]/<hc-root.>[<hardware-component-path>], where hardware-id=[:serial=<serial-number>][:part=<part-number>][:revision=<revision-number>, hardware-component-path=[<hc-segment>]* and hc-segment=/<hc-list[i].hc-name>=<hc-list[i].hc-id>. (Note: "i" corresponds to an index into the hardware list component array).

For example, the following hierarchical text string representation: "hc://product-id=SunFire15000, chassisid=138A2036, domain-id=A/chassis/system-board=0/cpu-module=2/cpu=8," represents CPU 8 of CPU Module 2 on System Board 0.

A diagnosis engine ("diag-engine") scheme delivers information necessary to identify a diagnosis engine associated with a particular fault event. In one embodiment of the invention, the diag-engine scheme includes the name and version of the diagnosis engine, as well as the system identifier corresponding to the system in which the diagnosis engine resides. The diag-engine scheme includes some or all of the following name-value pairs:

| Name | Type | Description |
|---|---|---|
| scheme | String | value = "diag-engine" |
| authority | Authority (as described above) | System identifier |
| Name | String | Name of diagnosis engine |
| Version | String | Version number of the diagnosis engine |

The general syntax for the diag-engine scheme may be as follows: diag-engine://[<authority>]/de=<diagnosis-engine-name>/:version=<version>. For example, the following hierarchical text string representation: diag-engine://product-id=E450, chassis-id=238B2036/de=eversholt/:version=1.0, represents an Eversholt diagnosis engine running on an E450, chassis number 238B2036.

A device ("dev") scheme delivers information to identify an I/O device instance. When a physical device path is not available to the event generator, a "dev" identifier must be provided in the FMRI type. This scheme is typically used in the detector component of the error event or to represent various elements within a suspect list.

The dev scheme includes some or all of the following name-value pairs:

| Name | Type | Description |
|---|---|---|
| scheme | String | value = "dev" |
| authority | Authority (as described above) | System identifier |
| devid | String | Device identification number |
| device-path | String | device tree path |

The general syntax for the dev scheme may be as follows: dev://[<authority>][/:devid=<devid>]/<physical-device-path>, where the physical-device-path=<dev-root>[/<device-path-segment>]+, the device-path-segment=<nodename>[@[<agent-identifier>][,][instance][:<node-type>]]. For example, the hierarchical text string representation for a SCSI disk device may be presented using the dev scheme as follows: dev:///devices/pci@8,700000/scsi@6/sd@6,0:g/:devid=1234

A service ("svc") scheme includes information to identify a single-node service instance. This scheme is typically used to define the detector component of the error event or portions of the various elements within the suspect list.

The svc scheme includes some or all of the following name-value pairs:

| | | |
|---|---|---|
| scheme | String | value = "svc" |
| authority | Svc_Authority (described below) | System identifier |
| service-name | String | Service name |
| service-version | Integer | Service version |
| instance | Integer | Service instance |
| contract-id | Contract | Contract identifier |

The svc_authority may be defined using the following components: scope and system-FQN (fully qualified name). The scope component, typically of string type, defines the scope of the system FQN. The system-FQN component, typically of string type, includes the system fully qualified name. The general syntax for the svc scheme is as follows: svc://[<scope@>]system-FQN/<service-name>[:version]/<instance>[@<contractid>]. For example, the hierarchical text string representation of an Apache proxy server instance running on localhost is as follows: svc:/localhost/SUNW, apache/instance-2.

Those skilled in the art will appreciate that while the protocol is described with respect to error and fault events, the protocol may be to include other types of events.

The following example illustrates the operation of the protocol. This example, illustrates the error event telemetry flow and fault diagnosis of a local failed disk. In this fault scenario, the SCSI HBA driver detects a command timeout error and generates the following error report in response to a SCSI command timeout event that is encountered. The following error event is transmitted through a notification framework to a fault manager for diagnosis:

| Error Event | |
|---|---|
| version | 1 |
| class | ereport.io.scsi.cmd_timeout |
| ENA | 0x40524afe97531001 |
| detector: | dev |
| device-path: | /devices/pci@1f,4000/scsi@3 |
| disposition | SELF-CORRECTED |
| recoverable | TRUE |

The fault manager receives and records the error event and forwards it to a diagnosis engine. The diagnosis engine, using the information contained in the error event, then determines that a disk device soft upset has occurred. The fault manager, instead of externally issuing a fault event, delivers a notification (including information from the diagnosis engine) to a Soft Error Rate Discrimination (SERD) engine which determines whether a hard fault is encountered. The SERD engine applies the appropriate algorithm using data supplied with the notification and subsequently determines that the error was due to a soft upset. The SERD engine forwards the results of the analysis to the fault manager which subsequently generates the following fault event:

| Fault Event | |
|---|---|
| version | 1 |
| class | fault.io.SUNW,ssd.SU |
| fault-diag-time | Thu May 30 16:05:23 PDT 2002 |
| diag-engine | scheme: diag-engine |
| | authority: |
| |     product-id: E450 |
| |     chassis-id: 014B105 |
| |     name: SERD |
| |     version: 1 |
| ENA-list | 0x40524afe97531001 |
| certainty | 100 |
| ASRU | scheme: dev |
| | devid: |
| |     id1, sd@SSEAGATE_ST318203LSUN18G_LRC6147100070 |
| |     301B9L |
| | authority: |
| |     product-id: E450 |
| |     chassis-id: 014B105 |
| | device-path: /devices/pci@1f,4000/scsi@3/sd@0,0 |
| FRU | scheme: dev |
| | devid: |
| |     id1, sd@SSEAGATE_ST318203LSUN18G_LRC6147100070 |
| |     301B9L |

-continued

| Fault Event |
|---|
| authority:<br>    product-id: E450<br>    chassis-id: 014B105<br>    device-path: /devices/pci@1f,4000/scsi@3/sd@0,0 |

Those skilled in the art will appreciate that the error events, fault events, and suspect lists, described above may be generated in and transmitted to many different environments (e.g., in the kernel, a Solaris® domain and an associated service processor, disjoint Solaris® domains, user level applications, etc.). Each of the aforementioned event generation environments has a variety of constraints (e.g., resource usage constraints and operating context constraints, etc.) and requirements (e.g., security and reliability). Thus, while the format and data members of each fault event, error event, and suspect list are specified by the protocol, the data marshalling techniques are not. Accordingly, the specific data marshalling technique (e.g., mailbox messages, libnvpair (3LIB) encodings, XML SOAP messages) used by the generator and the receiver of the error event, fault event, suspect list, may be determined by the generator and acknowledged by the receiver, or vice-versa.

Further, error events, fault events, and suspect lists may be transmitted from the environment in which they were generated to another environment for diagnosis and notification purposes. As noted above, different environments have their own resource constraints and requirements. Accordingly, the protocol is not constrained by any specific transport mechanism used to propagate protocol events. The specific transport mechanism (e.g., the sysevent framework, mailbox delivery mechanisms for service processors, a variety of networked IPC methods, etc.) may be determined by the transmitter and agreed to by the receiver of the protocol event, or vice versa.

Embodiments of the invention may have one or more of the following advantages. The invention provides a means to allow components within the events to be self-describing. Self-described data members allow consumers to decode information without having prior knowledge of the type or structure of the protocol data. Further, the invention allows compatible changes to be made to an event without requiring changes to the receiver.

In addition, the invention provides a means to allow an event to be uniquely identified. The invention also defines events in a format suitable for use as a key into an Enterprise Services knowledge database. The invention also includes information that allows the events to uniquely define their origin, and in the case of fault events include information to identify the diagnosis engine that contributed to the diagnosis of the fault. The diagnosis engine and error identification may be subsequently used in post-mortem analysis of diagnosis accuracy, defects, and effectiveness.

The invention also provides a means for establishing a consistent namespace, syntax, and semantics for the reporting of error and fault data. Further, the invention provides a means to define an event at a level of detail necessary for the automation of core fault management activities.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for managing a fault comprising:
   detecting an error;
   gathering data associated with the error to generate an error event;
   categorizing the error event using a hierarchical organization of the error event;
   diagnosing the error using the error event to generate the fault;
   generating a fault event using the fault;
   forwarding the fault event to a fault management architecture agent; and
   initiating, by the fault management architecture agent, an action in accordance with the fault event,
   wherein gathering data associated with the error comprises gathering data to populate at least the following components within the error event:
   a version component defining a version of a protocol used to define the error event;
   a class component defining a name of the error event using the hierarchical organization of the error event;
   an error numeric association component uniquely identifying the error event;
   a detector component identifying a resource that detected the error; and
   a recoverable component indicating whether an error handler designated the error as recoverable.

2. The method of claim 1, further comprising:
   categorizing the fault event using a hierarchical organization of the fault event.

3. The method of claim 2, wherein a class component of the fault event defines a name of the fault event in accordance with the hierarchical organization of the fault event.

4. The method of claim 1, further comprising:
   organizing the error event using the error numeric association component.

5. The method of claim 1, wherein gathering data associated with the error further comprises:
   gathering data to populate a disposition component within the error event, wherein the disposition component indicates a result of an error handler attempt to correct the error.

6. The method of claim 5, wherein the disposition component comprises at least one selected from the group consisting of uncorrected, self-corrected, uncorrectable, and soft-corrected.

7. The method of claim 1, wherein the class component is defined using a string representation of the hierarchical organization of the error event.

8. The method of claim 1, wherein the error numeric association component is defined using at least one format selected from the group consisting of Format 0, Format 1, Format 2, and Format 3.

9. The method of claim 8, wherein Format 0 comprises a pointer to an error propagation tree.

10. The method of claim 8, wherein Format 1 comprises a time element, a central processing unit identification element, and a generation element.

11. The method of claim 8, wherein Format 2 comprises a time element, a sequence number element, and a generation element.

12. The method of claim 8, wherein Format 3 comprises code indicating an extended format field.

13. The method of claim 1, wherein the detector component is defined using a fault managed resource identifier.

14. The method of claim 13, wherein the fault managed resource identifier comprises an authority element.

15. The method of claim 13, wherein the fault managed resource identifier is defined using a scheme.

16. The method of claim 15, wherein the scheme comprises at least one selected from the group consisting of a hardware component scheme, a diagnosis-engine scheme, a device scheme, and a service scheme.

17. The method of claim 1, wherein generating the fault event comprises gathering data to populate at least the following components in the fault event:
   a version component defining a version of a protocol used to define the fault event;
   a class component defining a name of the fault event using the hierarchical organization of the fault event;
   a diagnosis engine identifier component identifying a diagnosis engine used to obtain the fault;
   an error numeric association list component including at least one error numeric association;
   an automatic system reconfiguration unit component defining a unit that may be reconfigured in response to the fault;
   a resource component defining a finest-grain resource identified by the diagnosis engine;
   a field replaceable unit component defining a unit that must be repaired to clear the fault; and
   a certainty component identifying a level of certainty attributed to the fault diagnosed by the diagnosis engine.

18. The fault event of claim 17, wherein generating the fault event further comprises:
   gathering data to populate a fault diagnosis time component, wherein the fault diagnosis component further comprises indicating a time the diagnosis of the fault was performed.

19. The method of claim 17, wherein the class component is defined using a string representation of the hierarchical organization of the fault event.

20. The method of claim 17, wherein the at least one error numeric association of the error numeric association list component of the fault event is defined using at least one format selected from the group consisting of Format 0, Format 1, Format 2, and Format 3.

21. The method of claim 20, wherein Format 0 comprises a pointer to an error propagation tree.

22. The method of claim 20, wherein Format 1 comprises a time element, a central processing unit identification element, and a generation element.

23. The method of claim 20, wherein Format 2 comprises a time element, a sequence number element, and a generation element.

24. The method of claim 20, wherein Format 3 comprises code indicating an extended format field.

25. The method of claim 17, wherein at least one selected from the group consisting of the diagnosis engine identifier component, the automatic system reconfiguration unit component, the field replaceable unit component and the resource component is defined using a fault managed resource identifier.

26. The method of claim 25, wherein the fault managed resource identifier comprises an authority element.

27. The method of claim 25, wherein the fault managed resource identifier is defined using a scheme.

28. The method of claim 27, wherein the scheme comprises at least one selected from the group consisting of a hardware component scheme, a diagnosis-engine scheme, a device scheme, and a service scheme.

29. The method of claim 1, wherein generating the fault event comprises associating the fault event with a suspect list.

30. The method of claim 29, wherein the suspect list comprises:
   a universal unique identifier component identifying the suspect list;
   a diagnosis engine identifier component identifying a diagnosis engine used to diagnose the error event that subsequently generated the fault event; and
   a fault-events component listing the fault event.

31. A system for managing a fault comprising:
   an error handler detecting an error and generating an error event using the error, wherein the error is defined using a hierarchical organization of the error event;
   a fault manager diagnosing the error event to obtain the fault and generating a fault event using the fault, wherein the fault event is defined using a hierarchical organization of the fault event; and
   a fault management architecture agent receiving the fault event and initiating an action in accordance with the fault events,
   wherein the error event comprises at least:
      a version component defining a version of a protocol used to define the error event;
      a class component defining a name of the error event using the hierarchical organization of the error event;
      an error numeric association component uniquely identifying the error event;
      a detector component identifying a resource that detected the error; and
      a recoverable component indicating whether the error handler designated the error as recoverable.

32. The system of claim 31, wherein the fault manager organizes the event using the error numeric association component of the error event.

33. The system of claim 31, wherein the fault management architecture agent organizes the fault event using an error numeric association component of the fault event.

34. The system of claim 31, wherein the error event further comprises:
   a disposition component indicating a result of an error handler attempt to correct the error.

35. The system of claim 34, wherein the disposition component comprises at least one selected from the group consisting of uncorrected, self-corrected, uncorrectable, and soft-corrected.

36. The system of claim 31, wherein the class component is defined using a string representation of the hierarchical organization of the error event.

37. The system of claim 31, wherein the error numeric association component is defined using at least one format selected from the group consisting of Format 0, Format 1, Format 2, and Format 3.

38. The system of claim 37, wherein Format 0 comprises a pointer to an error propagation tree.

39. The system of claim 37, wherein Format 1 comprises a time element, a central processing unit identification element, and a generation element.

40. The system of claim 37, wherein Format 2 comprises a time element, a sequence number element, and a generation element.

41. The system of claim 37, wherein Format 3 comprises code indicating an extended format field.

42. The system of claim 31, wherein the detector component is defined using a fault managed resource identifier.

43. The system of claim 42, wherein the fault managed resource identifier comprises an authority element.

44. The system of claim 42, wherein the fault managed resource identifier is defined using a scheme.

45. The system of claim 44, wherein the scheme comprises at least one selected from the group consisting of a hardware component scheme, a diagnosis-engine scheme, a device scheme, and a service scheme.

46. The system of claim 31, wherein the fault event comprises at least:
   a version component defining a version of a protocol used to define the fault event;
   a class component defining a name of the fault event using the hierarchical organization of the fault event;
   a diagnosis engine identifier component identifying a diagnosis engine used to obtain the fault;
   an error numeric association list component including at least one error numeric association;
   an automatic system reconfiguration unit component defining a unit that may be reconfigured in response to the fault;
   a resource component defining a finest-grain resource identified by the diagnosis engine;
   a field replaceable unit component defining a unit that must be repaired to clear the fault; and
   a certainty component identifying a level of certainty attributed to the fault diagnosed by the diagnosis engine.

47. The system of claim 46, wherein the fault event further comprises:
   a fault diagnosis time component indicating a time the diagnosis of the fault is performed.

48. The system of claim 46, wherein the class component is defined using a string representation of the hierarchical organization of the fault event.

49. The system of claim 46, wherein the at least one error numeric association of the error numeric association list component of the fault event is defined using at least one format selected from the group consisting of Format 0, Format 1, Format 2, and Format 3.

50. The system of claim 49, wherein Format 0 comprises a pointer to an error propagation tree.

51. The system of claim 49, wherein Format 1 comprises a time element, a central processing unit identification element, and a generation element.

52. The system of claim 49, wherein Format 2 comprises a time element, a sequence number element, and a generation element.

53. The system of claim 49, wherein Format 3 comprises code indicating an extended format field.

54. The system of claim 46, wherein at least one selected from the group consisting of the diagnosis engine identifier component, the automatic system reconfiguration unit component, the field replaceable unit component, and the resource component is defined using a fault managed resource identifier.

55. The system of claim 54, wherein the fault managed resource identifier comprises an authority element.

56. The system of claim 54, wherein the fault managed resource identifier is defined using a scheme.

57. The system of claim 56, wherein the scheme comprises at least one selected from the group consisting of a hardware component scheme, a diagnosis-engine scheme, a device scheme, and a service scheme.

58. The system of claim 31, wherein the fault event is included in a suspect list.

59. The system of claim 58, wherein the suspect list comprises:
   a universal unique identifier component identifying the suspect list;
   a diagnosis engine identifier component identifying a diagnosis engine used to diagnose the error event that subsequently generated the fault event; and
   a fault-events component listing the fault event.

60. The system of claim 31, wherein diagnosing the error event comprises forwarding the error event to a diagnosis engine.

61. A network system having a plurality of nodes, comprising:
   an error handler detecting an error and generating an error event using the error, wherein the error is defined using a hierarchical organization of the error event;
   a fault manager diagnosing the error event to obtain a fault and generating a fault event using the fault, wherein the fault event is defined using a hierarchical organization of the fault event; and
   a fault management architecture agent receiving the fault event and initiating an action in accordance with the fault event,
   wherein the error handler is implemented on at least two of the plurality of nodes,
   wherein the fault manager is implemented on at least two of the plurality of nodes,
   wherein the fault management architecture agent is implemented on at least two of the plurality of nodes, and
   wherein the error event comprises:
      a version component defining a version of a protocol used to define the error event;
      a class component defining a name of the error event using the hierarchical organization of the error event;
      an error numeric association component uniquely identifying the error event;
      a detector component identifying a resource that detected the error; and
      a recoverable component indicating whether the error handler designated the error as recoverable.

62. The network system of claim 61, wherein the error detection and generation of the error event occur on separate nodes of the plurality of nodes.

63. The network system of claim 61, wherein reception of the error event by the fault manager and diagnosis of the error event by a diagnosis engine occur on separate nodes of the plurality of nodes.

64. The network system of claim 61, wherein the fault manager organizes the error event using the error numeric association component of the error event.

65. The network system of claim 61, wherein the fault management architecture agent organizes the fault event using an error numeric association component of the fault event.

* * * * *